3,564,097
STABLE MULTIVITAMIN TABLETS CONTAINING TRICALCIUM PHOSPHATE
Louis Magid, 199 Haddenfield Road, Clifton, N.J. 07013
No Drawing. Filed Apr. 5, 1968, Ser. No. 719,235
Int. Cl. A61k 15/10
U.S. Cl. 424—284     2 Claims

ABSTRACT OF THE DISCLOSURE

Sugar coated multivitamin tablets containing a high potency of vitamin E are stabilized against cracking and oil bleeding by the inclusion of tricalcium phosphate in the formulation in lieu of conventional excipients.

BACKGROUND OF THE INVENTION

It is desirable to include vitamin E active compounds in coated multivitamin tablet formulations, however, their inclusion has been limited by the fact that sugar coated tablets containing these materials have stability problems. This is particularly true when the formulation contains more than 10 units of vitamin E per tablet of from about 240 to 360 milligrams in weight. The vitamin E active compounds are oily materials which have a tendency to bleed out of the tablet, particularly upon storage, thus causing cracking of the sugar coating.

SUMMARY OF THE INVENTION

This invention relates to sugar coated vitamin tablet preparations containing vitamin E-active materials. More particularly, this invention relates to sugar coated multivitamin tablet preparations containing vitamin E-active materials, and tricalcium phosphate in lieu of the usual excipients, e.g., dicalcium phosphate, lactose, corn starch and the like.

DETAILED DESCRIPTION OF THE INVENTION

Vitamin E comprises a group of seven natural substances known as tocopherols. They are fat soluble, closely related chemical compounds found in vegetable oils such as wheat germ oil, rice oil, soybean oil and the like. $\alpha$-Tocopherol has the greatest biological activity while its isomers, beta, gamma, delta, epsilon, zeta and eta tocopherols have vitamin E activity to a lesser extent. The tocopherols and their esters such as tocopherol acetate, tocopherol palmitate, tocopherol succinate and the like are normally water-insoluble and oily or waxy, which properties limit their admixture with other materials for oral administration, e.g., sugar coated mulltivitamin tablets. It has been found that sugar coated multivitamin tablets containing high potencies of vitamin E-active materials and which do not crack or bleed oil can be formed if the usual excipients are replaced in part or wholly by tricalcium phosphate.

The vitamin E-active materials, e.g., tocopherols, can be incorporated into the multivitamin tablets of this invention in the form of a dry powder. Typical of the dry powders are combinations of vitamin E oil and an inert carrier material such as hydrolyzed gelatin, finely divided silica, acacia and the like. Generally, from about 35% to about 65% by weight of the oil is combined with the carrier. The preferred combinations for use in this invention are compositions containing about 50% vitamin E oil by weight combined with about 50% hydrolyzed gelatin by weight and about 60% by weight of vitamin E oil combined with about 40% finely divided silica by weight. The amount of vitamin E activity which can be be incorporated into the vitamin tablets according to this invention can vary from about 10 units to about 30 units per tablet of about 240 to about 360 milligrams. The preferred amount is from about 15 units to about 30 units of vitamin E activity per tablet. Generally, less than 10 units of vitamin E activity per tablet does not present stability problems and more than 30 units of vitamin E activity per tablet is not required in maintenance dose vitamin products.

The amount of tricalcium phosphate used in place of the usual excipients such as dicalcium phosphate, lactose, corn starch and the like is from about 1.5 parts to about 5 parts by weight for each unit of vitamin E activity per tablet. Tricalcium phosphate also known as "bone ash" is an amorphous, odorless, tasteless powder which is insoluble in water. It is commercially available as an unmilled powder or as a finely divided, milled powder which passes through a 200 mesh screen containing 200 openings per linear inch. For use in this invention, it is preferred to use the finely divided, milled tricalcium phosphate.

The preferred vitamin E powders useful in this invention can be prepared by the process disclosed in U.S. Pat. No. 3,138,532, i.e., by spray drying an emulsion of the vitamin E-active compound, e.g., dl-tocopherol acetate, in hydrolyzed gelatin, or, by absorbing the oily vitamin E on finely divided silica. The vitamin tablets of this invention are prepared by conventional wet granulation procedures. Thus, the tablets are prepared by mixing together a vitamin E-active material, tricalcium phosphate, other vitamins which are unaffected by the conditions of wet granulation, e.g., riboflavin, pyridoxine, niacinamide and ascorbic acid or sodium ascorbate or mixtures thereof and a binder, granulating with water, drying, then adding the remaining desired vitamins and a lubricant, e.g., calcium stearate and compressing into tablets with a conventional tabletting machine, then sealing and sugar coating the tablets in the conventional manner, e.g., by sealing with shellac, subcoating with syrup and dusting powder, coloring and smoothing with syrup and waxing and polishing. The vitamins added after the wet granulation are those which are unstable in a wet granulation process, e.g., vitamin A acetate, calcium pantothenate, thiamine mononitrate, vitamin $B_{12}$, vitamin D and the like.

In order to determine the stability of the tablets, they are stored at 45° C. and 55° C. for varying time periods and visually examined for signs of deterioration.

The following examples illustrate the invention which is not limited to the specific embodiments shown therein.

EXAMPLE 1

The following formulations were utilized in forming multivitamin tablets:

| | Parts by weight | | | | | |
|---|---|---|---|---|---|---|
| | A | B | C | D | E | F |
| Riboflavin | 2.75 | 2.75 | 2.75 | 2.75 | 2.75 | 2.75 |
| Pyridoxin HCl | 1.10 | 1.10 | 1.10 | 1.10 | 1.10 | 1.10 |
| Niacinamide | 21.00 | 21.00 | 21.00 | 21.00 | 21.00 | 21.00 |
| Ascorbic acid | 77.00 | 77.00 | 77.00 | 77.00 | 55.00 | 77.00 |
| Vitamin E, 50% hydrolyzed gelatin | 42.00 | 63.00 | 63.00 | 63.00 | 21.00 | 41.00 |
| Pregelatinized starch binder (Amijel Boll) | 16.00 | 16.00 | 18.00 | 20.00 | 15.30 | 16.00 |
| Tricalcium phosphate | 94.70 | 48.70 | 96.70 | 142.70 | 94.00 | |
| Dicalcium phosphate (anhydrous milled) | | | | | | 94.70 |
| Vitamin A acetate, 500 million units/gm | 12.50 | 12.50 | 12.50 | 12.50 | 12.50 | 12.50 |
| d-Calcium pantothenate | 1.50 | 1.50 | 1.50 | 1.50 | 1.50 | 1.50 |
| Thiamine mononitrate | 2.20 | 2.20 | 2.20 | 2.20 | 2.20 | 2.20 |
| Vitamin $B_{12}$ 0.1% in gelatin | 1.20 | 1.20 | 1.20 | 1.20 | 1.20 | 1.20 |
| Calcium stearate | 1.25 | 1.25 | 1.25 | 1.25 | 1.25 | 1.25 |
| Silica (Cabosil M7) | 1.20 | 1.20 | 1.20 | 1.20 | 1.20 | 1.20 |
| Vitamin D, 850 million units/gm | 0.60 | 0.60 | 0.60 | 0.60 | 0.60 | 0.60 |
| Tablet weight (mg.) | 275 | 250 | 300 | 350 | 235 | 274 |

The riboflavin, pyridoxin, niacinamide, ascorbic acid, vitamin E, Amijel and tricalcium phosphate were passed through a Fitzpatrick mill equipped with a No. 1 screen then granulated with water. The granules were dried overnight at 115° F. and then passed through a Fitzpatrick mill, equipped with a No. 1-B screen operating at medium speed, with knives forward.

The granulation was then admixed with the remaining ingredients listed in the preceding formulations. Thereafter, the mixture was compressed into tablets using a 15/32" flat-faced beveled edge punch and the tablets, weighing between 240 and 360 mg., were sealed and sugar coated by sealing with shellac, subcoating with syrup and dusting powder, coloring and smoothing with syrup, and waxing and polishing.

The tablets formed as in the preceding were tested for stability upon storage at 45° C. and 55° C. with the following results:

| Formulation | Mg. tricalcium phosphate per tablet | Tablet weight | Units vitamin E per tablet | Days to show oil seepage and cracking | |
|---|---|---|---|---|---|
| | | | | 45° C. | 55° C. |
| A | 94 | 275 | 20 | >60 | >30 |
| B | 49 | 250 | 30 | >90 | 9 |
| C | 97 | 300 | 30 | >90 | 9 |
| D | 144 | 350 | 30 | >90 | >24 |
| E | 94 | 235 | 10 | >150 | >90 |
| F | 0 | 274 | 20 | <30 | 3 |

As may be seen from the preceding data, those tablets containing at from about 1.5 parts to about 5 parts of tricalcium phosphate per unit of vitamin activity have good stability in regard to oil seepage and cracking of the sugar coating. The stability is improved as the ratio is increased.

I claim:
1. A stable, sugar coated multivitamin tablet composition containing (a) a material having from about 10 units to about 30 units of vitamin E activity and (b) from about 1.5 parts to about 5 parts by weight of finely divided tricalcium phosphate per unit of vitamin E activity.

2. The composition of claim 1 wherein the material having vitamin E activity is present in a powder composition containing about 60% by weight of vitamin E combined with about 40% by weight of finely divided silica.

References Cited

UNITED STATES PATENTS

| 2,940,900 | 6/1960 | Benton et al. | 424—284 |
| 3,138,532 | 6/1964 | Aiello et al. | 424—236 |
| 3,247,064 | 4/1966 | Maekawa et al. | 424—284 |
| 3,332,848 | 7/1967 | Magid | 424—266 |

OTHER REFERENCES

Moss, H. V.: "Chem. Abstracts," vol. 28, p. 7054$_2$ (1934).

Kviesitis, B.: "Chem. Abstracts," vol. 55, p. 7698e (1961).

ALBERT T. MEYERS, Primary Examiner

U.S. Cl. X.R.

424—128

PO-1050
(5/69)

UNITED STATES PATENT OFFICE
CERTIFICATE OF CORRECTION

Patent No. __3,564,097__   Dated __February 16, 1971__

Inventor(s) __Louis Magid__

It is certified that error appears in the above-identified patent and that said Letters Patent are hereby corrected as shown below:

In the Title Paragraph the Assignee is omitted please insert   after Clifton, N.J. 07110

Assignor to   Hoffmann-La Roche Inc., Nutley, New Jersey, a corporation of New Jersey Signed and sealed this 12th day of October, 1971.

(SEAL)
Attest:

EDWARD M. FLETCHER, JR.
Attesting Officer

ROBERT GOTTSCHALK
Acting Commissioner of Patent